United States Patent

Zamel et al.

[11] Patent Number: 6,081,544
[45] Date of Patent: Jun. 27, 2000

[54] FLEXURE MOUNTING OF OPTICAL RESONATOR FOR PRECISION LASERS

[75] Inventors: James M. Zamel, Hermosa Beach; Vicko N. Skokandic, Rancho Palos Verdes, both of Calif.

[73] Assignee: TRW Inc., Redondo Beach, Calif.

[21] Appl. No.: 09/057,196

[22] Filed: Apr. 8, 1998

[51] Int. Cl.[7] .................. H01S 3/08; H01S 3/04; H01S 3/121
[52] U.S. Cl. ............ 372/107; 372/107; 372/36; 372/15; 372/30; 372/95; 372/97; 372/99; 372/103
[58] Field of Search ............... 372/107, 15, 30, 372/95, 97, 99, 103

[56] References Cited

U.S. PATENT DOCUMENTS

| | | | |
|---|---|---|---|
| 4,439,862 | 3/1984 | Mohler | 372/107 |
| 5,303,254 | 4/1994 | Szatmari | 372/87 |
| 5,991,015 | 11/1999 | Zamel et al. | 356/222 |

*Primary Examiner*—Frank G. Font
*Assistant Examiner*—Delma R. Flores Ruiz
*Attorney, Agent, or Firm*—Michael S. Yatsko; Ronald M. Goldman

[57] ABSTRACT

The laser beam produced by the improved precision laser maintains an axial stability of less than 20 micro-radians in the presence of ambient temperature changes and shock and vibration of as much as 100 g's, achieving a new milestone in stability. In the new laser one end of the resonator (7) is hard mounted to the laser bench (13) and the other end of the resonator is mounted to that laser bench by a flexure (17). The flexure is designed to resiliently yield in the presence of thermally induced strain on the bench while retaining sufficient stiffness against foreseeable shock and vibration.

20 Claims, 3 Drawing Sheets

FLEXURE MOUNTING OF OPTICAL RESONATOR FOR PRECISION LASERS

FIELD OF THE INVENTION

This invention relates to precision lasers and, more particularly, to stabilizing the laser beam axis direction against any changes in ambient temperature, shock and/or vibration which the laser encounters.

BACKGROUND

The introduction of the laser demonstrated the recently discovered physical principle of light amplification through stimulated emission of radiation. In this the atoms or molecules of a crystal, gas or other substance, the medium, are bombarded with externally supplied photons, so that many of the atoms within the medium are raised from a lower or ground state to a higher atomic energy level. Those energized atoms are said to be "excited". If a photon whose frequency corresponds to the energy difference between the excited and ground states of the atom strikes an excited atom, the struck atom is stimulated, and falls back to a lower energy state, releasing that increment of energy as light. The struck atom thereby emits a second photon of the same or a proportional frequency.

The emitted photon is in phase with and in the same direction as the striking photon, a stimulated emission. The two photons continue to travel in the medium and may then strike additional excited atoms, stimulating additional photon emissions, all of which are of the same frequency and phase. As that action at the atomic level rapidly grows, the atoms in the medium discharge in a chain-like reaction to produce a burst of coherent radiation that propagates in a straight line. Low levels of applied incoherent light are thus essentially converted by a laser into an intense essentially monochromatic coherent light beam.

Since discovery of that principle, many practical forms of lasers have been developed and applied in various applications in the professions, business, industry and government, ranking the laser as one of the most important scientific innovations of the twentieth century. So numerous and widespread are its applications, that the laser has quickly become known even to the public at large; and with such variety the lasers have come to be separately categorized or classed. Among those classes is found one whose characteristic accuracy conforms to extremely high or tight tolerances, on the order of a few microradians or better, which are referred to as precision lasers. The present invention is for a precision laser, one that is believed more useful than earlier types, due to the superior beam stabilization attained, an achievement that is believed to place the precision laser described in the following text at the head of its class.

In brief, a practical laser includes a gain module, which contains the light pumping source which produces the energizing photons or, as variously termed, light, the laser medium, referred to as an accumulator, which is optically pumped by light from that source to emit photons, and a resonator, containing two mirrors, located at respective ends of the gain module, for reflecting photons issuing from the ends of the gain module back into that gain module. Essentially the quantity of emitted photons increases as the emitted photons are reflected back and forth between the mirrors through the medium striking additional excited atoms within the medium. One of the two mirrors is partially light transmissive. That mirror additionally passes a coherent light beam generated in the laser medium, that travels in a straight line, which defines the beam axis. The resonator and the gain module are both mounted to a thick metal plate, referred to as the laser bench, with the gain module mounted inside the resonator in between the two mirrors.

As recognized, the foregoing only briefly touches upon the theory and structure of the laser as background to the present invention, and the interested reader may refer to the abundant literature for additional details and theory. The present invention also includes those basic elements.

It is important to note that the direction of the laser beam axis is dependent on the orientation of the two mirrors in the resonator. Those mirrors are aligned with the greatest precision in parallel. This is accomplished, for one, by placing the axes of the mirrors precisely in parallel. Precision lasers require those resonator optics to be extremely stable, which maintains a high quality laser beam and accurate beam pointing. That has not been entirely possible heretofore in some of that laser's applications.

One application for precision lasers is in targeting objects, typically a military function. In that application the laser beam is directed to and strikes a target; and the light is reflected from the target back toward the laser. In one application the light beam is reflected back to a receiver, which derives information from the reflected beam that is useful for targeting. In another important targeting application, a laser guided projectile is guided by the reflected light to its target.

Where the targeting laser is being carried on a fast moving vehicle, the laser is subjected to any shock and vibration encountered by the vehicle. As example, if a projectile is launched from that vehicle during laser targeting, the propellant detonation from that launch produces an intense shock, as high as 100 g's. The targeting laser is subjected to that shock. If the vehicle is moving fast through rough terrain, up and down through a series of pot holes in a road or field, that produces shock and vibration, which the vehicle's shock absorbers mitigate, but, as drivers know, may be unable to fully suppress. Unless the laser structure contains means to counteract that shock and vibration, the laser beam's axis may shift ever so slightly. Under such circumstances and with small targets at large distances from the vehicle, the light beam moves off the target.

Like other apparatus, the laser structure is also subjected to temperature changes, as might occur from day to day or even during the course of a day, particularly when the laser is necessarily located near other equipment that generates heat. Changes in temperature cause most materials, particularly metals, to change their dimension and/or shape to some degree, a well known phenomenon. That characteristic of the material is its thermal coefficient of expansion. During manufacture, the laser's two mirrors are aligned with great precision, placing the two mirrors precisely in parallel. But that adjustment is made in a facility in an environment that is at one ambient temperature. The laser may be subjected to different temperatures during transit to the customer. At the customer's facility it will be subject to the day to day variation. One can understand the drastic ambient temperature change to which a laser that is manufactured in Southern California in November is subjected to when it is delivered to a location in Alaska in the following month.

Another important application is an industrial one. Lasers have been adapted to serve as drills, one that drills small holes through metal and other materials. If the temperature changes and results in a shift of the beam axis, the relative location of successively drilled holes will change. For example, if drilling of a piece is not completed before the end of one business day, it may be completed the next morning. However the room temperature the next morning may differ drastically from that at the end of the prior business day.

With ordinary lasers in most applications, the effects of temperature change are considered minor and may be disregarded. Such is not the case for precision lasers. In a precision drilling operation holes of a diameter of two thousandths of an inch in diameter must be drilled perfectly perpendicular through the surface of the drilled material. The resultant holes cannot be elliptical or extend on a non-perpendicular axis. And hole to hole spacing must be accurate to a like measure.

When the laser resonator's optics, the two mirrors, are hard-mounted to a laser bench on opposite ends of the lasing medium, any bench motion is deleteriously transmitted to the optics, degrading the laser's performance. The beam may wobble or shift ever so slightly with the bench motion. Others have recognized that problem and offered solutions, which, until the present invention, were the best available solutions. Conventionally, to minimize those external effects, the optics are mounted to a resonator structure that is very stiff. And the resonator structure in turn is attached to the laser bench through "slides" or "kinematic balls". The latter devices, however, are not resistant to loads or forces encountered in transportation, external machinery or to other shock and vibration sources.

The prior "slide" approach to resolving the temperature and vibration problem in precision lasers is a slip type joint formed by a pin and hole arrangement. In this structure, one end of the laser media assembly, where the totally reflecting mirror is located, is fixedly mounted to the support bed. At the opposite end, where the partially reflecting mirror, the optical coupler, is located, a bracket containing a longitudinally extending pin is fixed to the assembly end. That pin is inserted through a hole in another bracket that is fixed to the support bed. Through the pin, the bracket thus supports the weight of a portion of the laser assembly, which presses downward on the pin.

If the support bed expands due to temperature change, the bracket simply moves longitudinally, slipping along the pin, but not exerting any force or change on the optical coupler. If any longitudinal vibration and shaking occurs, the same action basically occurs. However, where shaking perpendicular to the pin occurs, depending upon the side clearance between the cylindrical walls of the pin and the like walls of the hole, some slight movement is possible. Although this clearance may be small, and the consequent wobbling insignificant for most applications, even such small variations are important to and are eliminated in the present invention. Moreover, static friction is encountered between the pin and the joint. Due to that friction, the elements do not always return to the same precise location when the temperature restores or the wobble ceases. The invention provides even greater stabilization and precision that such slip joint isolation and/or that with kinematic balls.

Accordingly, a principal object of the invention is to provide an improved precision laser, one in which the resonator's two mirrors are maintained in perfect alignment, even in adverse environmental conditions.

A further object of the invention is to improve axial stabilization of laser beams.

A still further object is to provide an improved precision laser that generates a laser light beam that remains on-axis despite changes in temperature and despite ambient shock and vibration impacting the precision laser.

An additional object of the invention is to provide a precision laser whose beam axis remains within ten or twenty micro-radians of the axis to which it is initially set, notwithstanding subsequent intervening changes of temperature, and/or application of shock and vibration.

And an ancillary object of the invention is to improve the precision and reliability of precision targeting and drilling applications.

SUMMARY OF THE INVENTION

The foregoing objects and advantages are realized in the improved laser. In addition to the basic elements earlier described, the improved laser also contains at least one flexure at one end of the resonator structure that connects to and supports an end of the resonator on the base, or, as otherwise termed, the laser bench. The opposite end of that resonator structure, which is relatively stiff, remains rigidly connected to the laser bench. Variations in temperature of the bench, which cause the bench to expand or contract, are effectively isolated from the resonator, since the flexure flexes in response to that expansion or contraction. By that isolation the resonator is able to avoid any deformation as could cant either of the two supported mirrors, changing the direction of the laser beam's axis. A like flexing effect occurs should the bench warp or bend due to a temperature differential occurring between the top and bottom surfaces of the laser bench that rotates the bottom of the flexure slightly.

Although flexing in response to forces created by thermal changes, the flexure is stiff to other forces. It remains firm when the laser is subjected to shock and vibration either vertically or sideways horizontally. The flexure is stiff enough and does not bend or compress when subjected to those forces and braces the resonator, thereby maintaining the resonator's dimensional stability and shape, and consequently maintaining the parallel orientation of the mirrors within that resonator.

The foregoing laser thus becomes almost invulnerable to variations in temperature and tolerates almost all reasonably expected shock and vibration, whether occurring separately or simultaneously. It suffers none of the drawbacks of the earlier slide and the kinematic balls approach.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustrations thereof presented in the accompanying drawings.

DETAILED DESCRIPTION OF THE PREFERRED EMBODIMENTS

Figure 1:
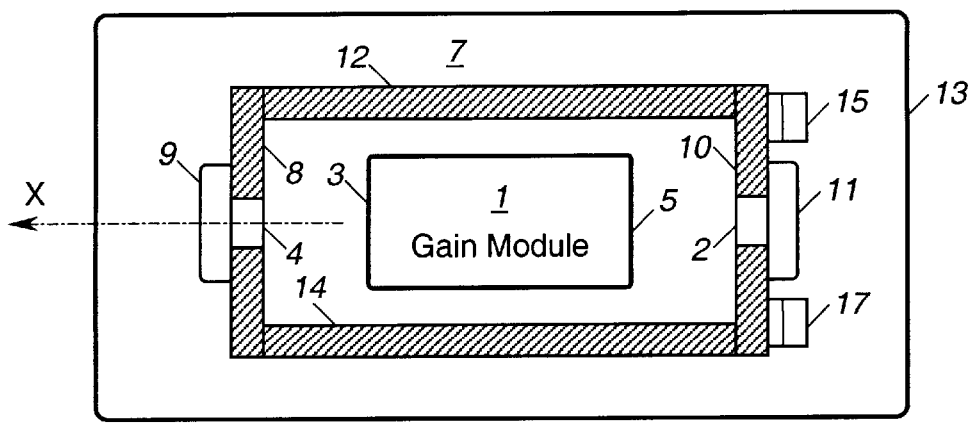
FIG. 1 illustrates an embodiment of the invention in top plan view.
Figure 2:
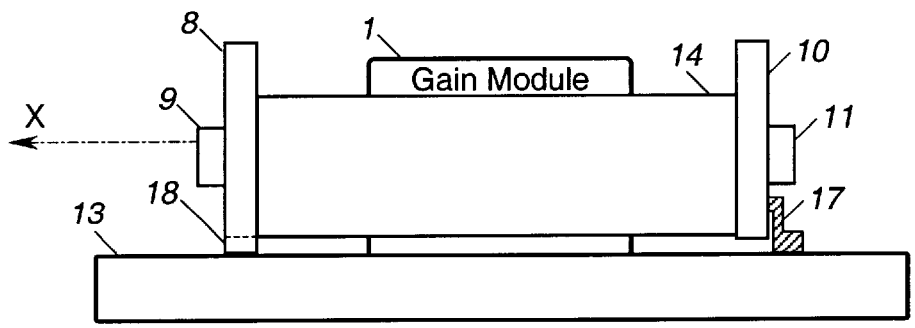
FIG. 2 is the embodiment of FIG. 1 as viewed from the side.

A preferred embodiment of the invention is illustrated, partially pictorially, in a top view and side view, respectively, in FIGS. 1 and 2 to which concurrent reference is made. The laser includes a conventional gain module 1, illustrated in block form, a generally elongated structure which emits photons during operation from its front 3 and rear 5 ends; a resonator structure 7, containing a mirror 9, which is partially light reflective and a second mirror 11, which is totally light reflective; and the foregoing components are supported upon a thick metal plate 13, referred to as a laser bench.

As familiar to those skilled in the laser art, the gain module 1 contains, packaged together in a single assembly or module, the light pumping component, which generates the the incoherent light energy, such as a gaseous light source, flash lamps or light emitting diodes, and the light pumped medium, as example a Neodymium doped Yttrium Aluminum Garnet (Nd:YAG) crystal or carbon dioxide gas, which receives and absorbs temporarily that incoherent light radiation and releases that energy as photons. As apparent the components forming the gain module can take many conventional forms, but, common to each form, the front 3 and rear end 5 of the gain module are transparent to the emitted photons, light. One gain module construction, which is suitable in the foregoing combination, is described in a prior co-pending application of Zamel et. al, one of the present inventors, entitled Diode Laser Pumped Solid State Laser Gain Module, Ser. No. 08/683,585 filed Jul. 15, 1996. Recognizing that the present improvement is independent of the particular details of the light pumping and laser media, those details are not separately illustrated or described.

In this embodiment, resonator 7 is formed of a pair of wide stiff rectangular shaped thick side beams 12 and 14, formed of carbon graphite, a stiff inextensible material with a very low coefficient of thermal expansion. The beams are spaced apart, are oriented in parallel and are located on opposite sides of gain module 1. At the left end in the figure, the two beams attach to a side 8. Side wall 8 contains a central window or aperture 4 through which photons may pass, and mirror 9 is attached to and supported by that wall with the reflecting side facing the aperture.

On the right side in the figure the opposite end of beams 12 and 14 attach to another side wall 10. That side wall also contains a central aperture 2, which allow photons to pass. Mirror 9 is attached to and is supported by that wall with its partially reflecting surface facing aperture 2. The foregoing resonator walls, preferably, are fabricated of the same metal, suitably stainless steel, to ensure uniform a thermal expansion characteristic.

It should be recognized that the mirror illustrations are pictorial in nature. In typical practical lasers the mirrors are mounted in a separate small holder or housing and the housing is fastened to the appropriate locations indicated within the resonator. As becomes apparent the details of the housing are not necessary to an understanding of the present invention and those details are therefore not given. An example of the details of one such practical mirror mounting structure which is suitable in the foregoing combination is described in the prior co-pending application of Zamel et al, a present inventor, entitled Face-Cooled High-Power Laser Optic Cell, Ser. No. 08/780,246, filed Jan. 8, 1997.

As is conventional Beams 12 and 14 provide stiff mirror-to-mirror supports that accurately position the two mirrors in spaced relationship, in parallel, so that the mirror's axis are in a predetermined alignment, either coaxial or in parallel in dependence on the requirements of the particular gain module, and, typically, perpendicular to base 13, with the totally reflecting mirror 11, facing one end of the gain module and the other partially reflecting mirror 9 facing the other end of that module. The mirrors are aligned precisely in parallel. The mirrors illustrated are flat. However, spherically curved mirrors are also used in those resonators. To place either kind of mirror in parallel means that the axis of those mirrors, transverse to the central axis, are placed in parallel; or that the central axes are oriented coaxially or in parallel, so that the curvature of the surface does not matter. The foregoing resonator structure is recognized as illustrative. Other known resonator structures may be substituted.

As better illustrated in FIG. 2, support 18 is integrally formed in one piece with and is essentially an extension of or foot to the bottom of wall 8 and that foot is located along the bottom of the wall. The support is permanently attached or bolted to bench 13 to support one end of the resonator in an elevated position above the surface of laser bench 13, and, accordingly, the axis of mirror 9 at that elevated position.

Further, a pair of support members, herein sometimes called flexures, 15 and 17 are attached on opposite right and left sides of the resonator between the end of the resonator and laser bench 13, and support the opposite end of the resonator. At the right end, flexure 17, by its connection to each of wall 10 and base 13, supports the right end of the resonator assembly to the base in an elevated position, and, the axis of mirror 11 is positioned at the same elevated position as the axis of mirror 9. Suitably the end supports position the resonator, more particularly, the central axis of the mirrors, an equal distance above the upper surface of laser bench 13.

Figure 3:
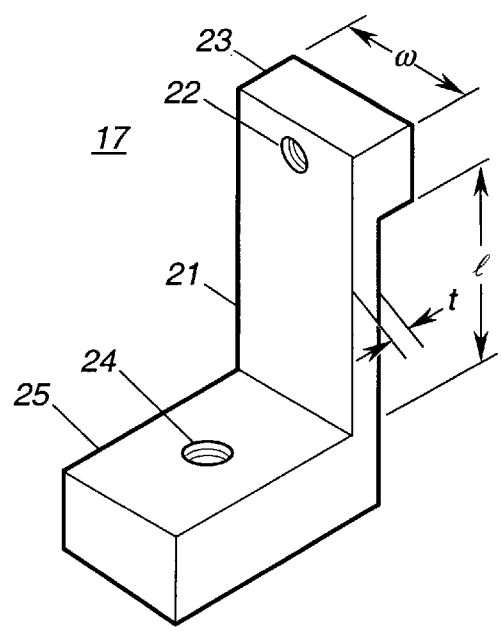
FIG. 3 is a perspective view of the flexure component used in the embodiment of FIGS. 1 and 2, drawn to a larger scale.

Reference is made to FIG. 3, which illustrates the flexible support member, flexure 17, in perspective drawn in a larger scale, the other flexure 15 of the pair forming the end support being identical in structure. The flexure is a wide thin elongate strip or beam 21 that is formed in one piece with the connector portions at each end. Integral to the upper end is a connector portion 23, suitably greater in thickness than beam 21. Integral to the lower end is another connector portion 25, formed of a thicker portion of the material and greater in length than the first connector portion, which extends at right angles to the flexure 21. Connector portion 23 is used to attach the flexure to side wall 10 in resonator 7, suitably with a bolt through bolt hole 22, and connector portion 25 attaches the flexure portion to bench 13, also with a bolt through bolt hole 24. The material of the flexure 7 should have the same thermal expansion characteristics as the foot 18 to maintain the levelness of the laser beam axis "x" under different environment temperatures. Stainless steel is an appropriate material.

It should be noted that in addition to the entire support 7 being referred to as a flexure, the beam 21 portion of that support may also quite correctly be referred to as a flexure. The reader is thus cautioned to consider the context of such reference to avoid confusion.

In operation of the laser with the mirrors properly adjusted, and with electrical power, not illustrated, supplied to gain module 1, the gain module produces photons which exit from each end. Those light photons that exit at the end confronting the totally reflective mirror 11, pass through the window in wall 8 and are incident on the mirror. The mirror reflects those light photons back into the gain module, where they add further energy. At the right, photons that exit the right end are incident on the partially reflecting mirror 9. Some incident photons are reflected back into the gain module, again adding energy. As explained earlier in the description of stimulated emission presented in the background to this specification, however, other photons pass through the partially reflective mirror as a beam of monochromatic coherent light. That beam propagates in a straight line along the axis X. This is the laser action with which one is familiar.

If for any reason one of the mirrors becomes canted relative to its initial position, the beam axis will shift. The function of the supporting flexures 15 and 17 is to prevent the shift in beam axis when the laser is subject to temperature change, shock and/or vibration.

Continuing with FIG. 3, flexure beam 21 is constructed to be stiff enough to carry reasonably anticipated loads, but is thin enough to flex, depending upon the direction of the respective applied forces. That is, it is incompressible and unyielding in the one direction, from the top in the figure, incompressible and unyielding in the second direction, from the side in the figure, and resiliently yielding in the third direction, where the ends are subjected to a relative opposite force, to the right and left in the figure. As texts on elementary mechanics of materials explains, a thin wide relatively lengthy rectangular strip or beam of material, suitably a metal, such as flexure or beam 21, possesses a flexibility and resilience, so long as the material is not stressed beyond its limit of elasticity and become permanently deformed. It is understood that by design, the flexure is not to be strained beyond its elastic limit by the forces encountered in the normal range of operation of the invention contemplated herein. Concurrently, beam 21 is also relatively incompressible and stiff in respect of forces applied to its end in the direction of its axis and in respect of forces applied to its side in the direction transverse to its axis. In respect to shock and vibration forces, support 17 behaves essentially like the rigid support 18, even when its flexural portion 21 is flexed.

As explained in the literature on rectangular columns, the stiffness of flexure 21 depends upon its thickness, its width and its length. In a static position, the load impressed on the supports by the resonator and its two mirrors is evenly divided between the supports on the right and left side. Thus, in that condition, the pair of flexures 15 and 17 support one half the static load, which in the combination is one half the weight of the resonator, including its mirrors, the rigid support 18 at the other end supporting the remaining half weight. Each flexure supports one-fourth of that weight. At a minimum in that static condition, the stiffness is such as to permit support of that weight without bending or flexing.

At a maximum the flexure's stiffness is such as to resist any bending or flexing when the assembly is subject to the maximum shock anticipated during operation of the laser assembly. As example, the present invention contemplates use in which the assembly is subjected to a shock pulse of as much as one-hundred G's. That is equivalent to one hundred times the static weight of the assembly. Thus each flexure according to the described weight distribution should support as much as 25 G's without bending or compressing under that force. A one-hundred G shock means the flexure will carry one-hundred times the weight of the resonator structure and the mirror and mount. The flexure must bear that shock without flexing.

Figure 4:
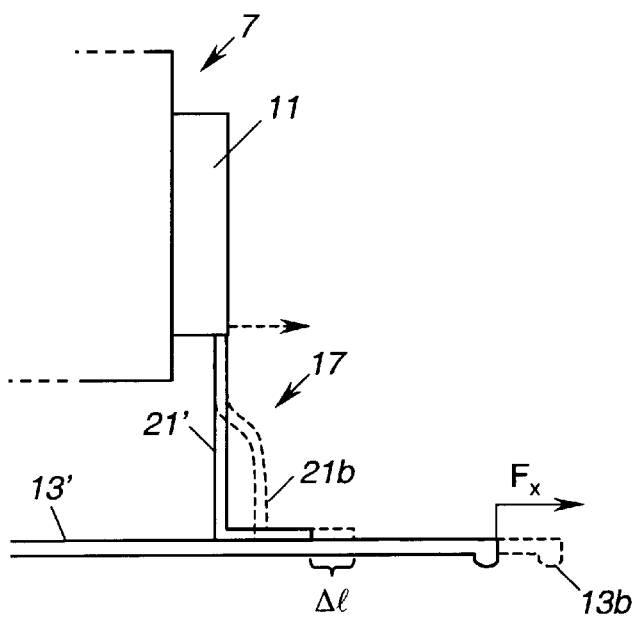
FIGS. 4 and 5 are pictorial views helpful to the discussion of the operation of the flexure in the laser apparatus.

Consider next an increase in ambient temperature, which affects bench 13 in its entirety, causing the bench and some of the other elements to expand and lengthen. The resonator's beams 12 and 14, being constructed of a very low coefficient of expansion material does not significantly lengthen. Bench 13, however, lengthens significantly relative to the microscopic distances contemplated, creating a slight differential in movement between the ends of the flexure 21 in FIG. 4. Accordingly, base 13 moves the lower connecting member 25 of the flexure ever so slightly to the right, relative to the upper connecting member 21, connected to the resonator, such as represented in the pictorial illustration of FIG. 4, which is exaggerated to assist this discussion. That relative movement, $\Delta l$, creates a pull, Fx, on the lower end of the flexure perpendicular to the flexure's thin rectangular portion and along the plane of the plate 13.

However, the other end of the flexure is firmly attached to resonator 7, and, therein, as shown in FIG. 2, through wall 10, to the beams 12 and 14. Each resonator beam is much thicker than the flexure, and, thus, in comparison, those beams have greater stiffness than does flexure 21 and does not stretch. The resonator's beams therefore do not sway or bend under that force and, as between the resonator beams and the flexure, the flexure must always yield first, that is, flex. Hence, the upper end of the flexure does not move, but remains fixed in relative position. Because of its resiliency, the flexure bends or flexes under that pulling force.

Returning to FIG. 4, as represented in the pictorial, the shape of the flexure 21 changes slightly, as represented by the change from 21 to 21b, the latter illustrated in dash lines, and the surface of that rectangular portion is no longer precisely at a right angle to plate 13. It is found that even in this distorted shape, as at 21b, the flexure possesses adequate stiffness to resist shock as would occur by a force along the side edge of flexure 21 into the plane of the paper or a vertical force applied through resonator 7 that presses down on the upper end of flexure 21 or vice-versa.

If the temperature again lowers to the initial level, the base 13 contracts to its initial length. Flexure 21 then resiliently restores to the original shape. The latter is a significant advantage as compared to the prior devices that rely on relative mechanical movement between separate elements and therefore encounter static friction between those elements. Because of the intervention of friction in those prior devices, when the temperature returns to the initial level, one cannot be assured that the support, and, hence, the end of the resonator returns precisely to the initial position. As example, if the expansion of the bench is minute, such as contemplated by the present invention, the force, on subsequent contraction of the bench, might be insufficient to overcome the static friction between elements in the support; and the mirror axis will thus remain slightly canted.

Figure 5:
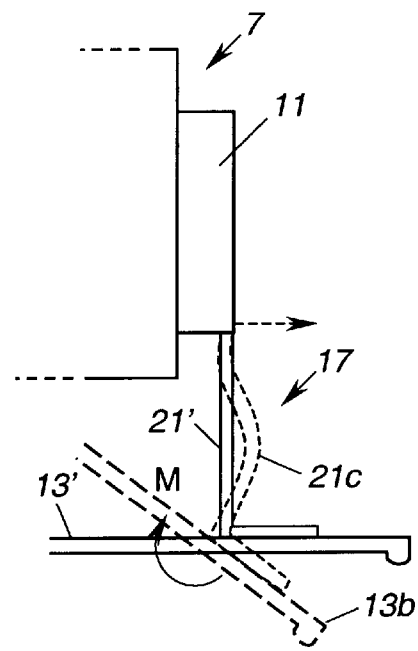

Next consider another possible situation in which there is a temperature differential between the upper and lower surfaces of the thick base 13. Assume the upper surface of the thick base increases in temperature, while the bottom surface does not, as example as might occur with the base resting upon a cold portion of an air conditioner while the upper surface remains exposed to ambient heat. Because of that temperature differential, the upper surface of bench 13 lengthens to a greater extent than the lower, the effect of which is to force the bench to warp or curve, as illustrated in the exaggerated pictorial of FIG. 5. Curving of the bench surface creates a canting or rotational force, M, on the bottom end of flexure 21, which acts to twist the flexure's bottom end.

For the reasons earlier described, the opposite end of the flexure remains fixed in position, since the beams 12 and 14 do not sway or bend, and the flexure must flex, but in a slightly different manner than above described, bulging outwardly, as represented in dash lines 21c. As in the preceding example, it is found that in this distorted shape, the flexure retains adequate stiffness to resist shock and vibration of the intensity earlier described. If the temperature differential ceases and both surfaces return to the same initial temperature, the base 13 contracts to its initial flat shape and the flexure resiliently restores to its original shape.

The kind of dimensional changes created by the temperature changes are somewhat small in the absolute sense, being but a few micro-inches, that is, a few millionths of an inch, but is significant in terms of the accuracy desired of a precision laser. The object of the compensating mechanism, it is recalled, is to limit any change in the axis of the partially reflecting mirror relative to the other mirror to twenty micro-radians or less.

In one practical embodiment, the flexure, exclusive of the end connecting portions, is 0.5 inch in width, 0.02 inches thick and 1.0 inches in length and the entire flexure, including end connecting portions, is constructed in one-piece from stainless steel. Recognizing that the thermal expansion characteristic of the flexure at the right support should be the same expansion characteristic as the left support 18 formed integrally at the lower portion of wall 8, the latter wall is formed of the same material in that practical embodiment. A pair of the foregoing flexures supported an end of a resonator of length twenty inches, width ten inches and height of eight inches over a bench of two inches in thickness.

Figure 6:
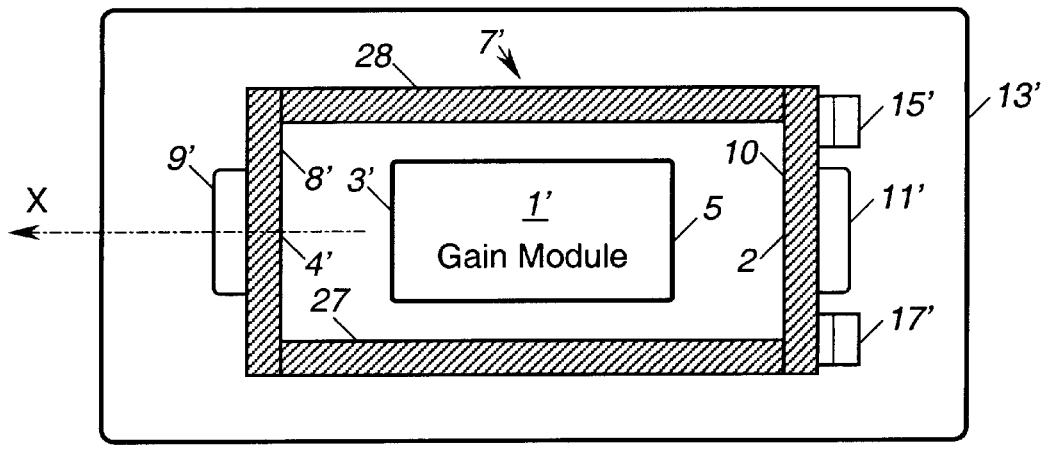
FIG. 6 illustrates another embodiment of the invention in a top section view.
Figure 7:
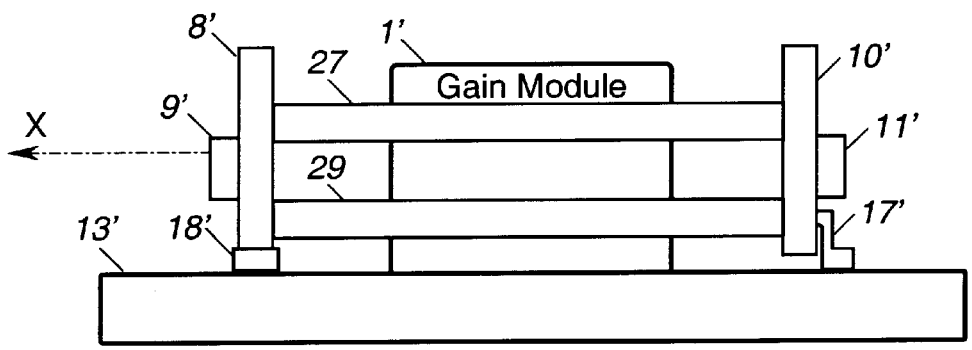
FIG. 7 illustrates the embodiment of FIG. 5 in side view.
Figure 8:
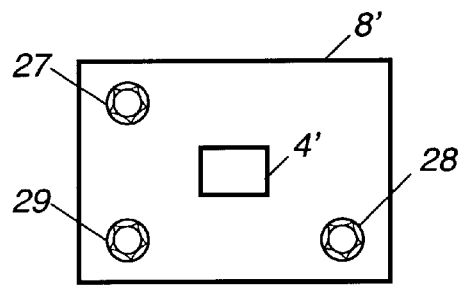
FIG. 8 is a cross section view of the resonator element in the embodiment of FIG. 5.

A second embodiment of the invention employs cylindrical shaped rods in the resonator instead of the pair of rectangular beams. Reference is made to FIGS. 6 and 7, which illustrate the alternative embodiment in a top and side view, respectively, and to the section view of the resonator illustrated in FIG. 8. For convenience the elements which appear in these figures are given the same numbers for identification that were used for those elements in the prior embodiment and are primed. To avoid unnecessary repetition, those elements are not again described in detail.

In this embodiment three cylindrical rods, two 27 and 29, on one side and one 28 on the other side replacing the rectangular shaped beam of the prior embodiment. As shown in FIG. 7, the pair of rods 27 and 29 are spaced apart and rigidly connected at the ends to the respective side walls 8' and 10'. The remaining rod 28 is located on the opposite side at a similar height and is consequently obscured from view in the side view of FIG. 7. The latter rod is also firmly attached to the side walls.

The rigid support 18', shown on the left, is a separate piece attached to the midpoint of end wall 8', which permits the wall and the support to be fashioned of different materials. Thus in this embodiment both the three rods and the side walls are fabricated of carbon graphite material, whereas supports 15', 18' and 17' are formed of the same metal, stainless steel. In accordance with the requirements outlined for the prior embodiment, both front and back end supports 15' and 17' and 18' should possess the same coefficient of thermal expansion to achieve the highest accuracy in maintaining the laser beam axis stable.

The rods provide a rigid mirror to mirror or wall to wall structure with suitable rigidity. However in total volume the cylindrical rods are less than the rectangular beam and thereby reduce the weight of the assembly. Further, the end walls may also be constructed of carbon graphite material, replacing stainless steel walls, reducing the weight of those elements. This reduces the load on the flexure, allowing the flexure to be thinner and more flexible.

The foregoing invention is able to maintain critical alignments in a variety of operating environments, while avoiding the need to use heavy, bulky laser benches to accomplish the same function. The optical alignment may be performed at a factory or depot, and that alignment will be maintained through shipping and during use in any of a variety of operating environments, such as military field deployed, vibration and thermal conditions, transportation conditions and robust factory conditions.

It is seen that the foregoing improvements are practical in nature. They do not change or modify the fundamental principles of light generation by stimulated emission. However, the improvements significantly enhance the axial stability of the generated beam, ensuring that reasonably foreseeable unavoidable external influences, ambient temperature and shock, do not adversely impact those light generating elements and cause the beam to stray. In so doing, the improvements extend the laser's capability in precision applications.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A precision laser comprising:

a gain module;

a resonator;

a bench;

said gain module and resonator being positioned overlying said bench;

said resonator comprising:

a first mirror, said first mirror being totally light reflective; and a second mirror, said second mirror being partially light reflective and partially light transmissive; and said first and second mirrors having respective axes aligned in the same predetermined direction;

said resonator and said gain module being interactively coupled together to generate a coherent beam of light through said second mirror; and axis shift preventing means for preventing a shift in relative alignment of said mirror axis in response to thermally induced change in dimension or shape of said bench and in response to shock and vibration.

2. The invention as defined in claim 1 wherein said axis shift preventing means comprises:

a first support for rigidly connecting an end of said resonator to said bench in elevated position above an upper surface of said bench;

a second support for connecting an opposite end of said resonator to said bench in said elevated position above said upper surface of said bench;

said second support comprising a flexure, said flexure being adapted to resiliently flex to prevent a change in alignment of one of said first and second mirrors relative to the other one responsive to thermally induced change in dimension or shape of said bench and being sufficiently stiff in characteristic to prevent flexure in response to shock and vibration forces in a direction perpendicular to said second mirror axis.

3. The invention as defined in claim 2, wherein said flexure comprises a thin flat wide elongate rectangular geometry.

4. The invention as defined in claim 2, wherein said resonator includes mirror support means for supporting said mirrors in fixed spaced relationship with said axis of each of said mirrors in predetermined alignment, said mirror support means being sufficiently rigid to withstand any pulling forces exerted thereon through said second support.

5. The invention as defined in claim 4, wherein said first and second support each comprise a material having the same coefficient of thermal expansion.

6. A precision laser comprising:
   a gain module;
   a resonator;
   a bench;
   said gain module and resonator being positioned overlying said bench;
   said resonator comprising:
      a first mirror, said first mirror being totally light reflective; and
      a second mirror, said second mirror being partially light reflective and partially light transmissive; and
      said first and second mirrors having respective axes aligned in the same predetermined direction;
      said resonator and said gain module being interactively coupled together to generate a coherent beam of light through said second mirror;
      a first support for rigidly connecting one end of said resonator to said bench in elevated position above an upper surface of said bench;
      a second support for connecting an opposite end of said resonator to said bench in said elevated position above said upper surface of said bench;
      said second support comprising at least one flexure, each said flexure being adapted to resiliently flex to prevent a change in alignment of one of said first and second mirrors relative to the other one responsive to thermally induced change in dimension or shape of said bench.

7. The invention as defined in claim 6, wherein each of said first and second support comprise materials having the same thermal expansion characteristic.

8. The invention as defined in claim 6 wherein each of said first and second support comprise stainless steel.

9. The invention as defined in claim 6 wherein said resonator includes at least first and second mirror to mirror support means mechanically connecting said mirrors in fixed relationship, wherein said mirror axes are oriented in predetermined alignment, said first and second mirror to mirror support means having identical elongate geometries, and said mirror to mirror support means being sufficiently rigid in characteristic to prevent deflection in response to any pulling forces exerted thereon by said second support.

10. The invention as defined in claim 6 wherein said resonator includes at least first and second mirror to mirror support means mechanically connecting said mirrors in fixed relationship, wherein said mirror axes are oriented in predetermined alignment, said first and second mirror to mirror support means having identical elongate geometries, and said mirror to mirror support means being sufficiently rigid in characteristic to prevent deflection of one portion of said mirror to mirror support relative to any other portion thereof in response to any pulling forces exerted thereon by said second support.

11. An improved laser for producing a beam of coherent light comprising:
   a gain module;
   a resonator operatively coupled to said gain module, said resonator having first and second ends and possessing a predetermined weight, said resonator including a pair of laser mirrors oriented in parallel;
   a base for supporting both said gain module and said resonator, said base having a predetermined thickness and length and coefficient of thermal expansion;
   first support means for supporting said first end of said resonator in predetermined elevated position above said base, said first support means being connected to said first end of said resonator and said base, said first support means being rigid and having a first coefficient of thermal expansion characteristic;
   second support means for supporting said second end of said resonator in said predetermined elevated position above said base, said second support means being connected to two spaced locations on each of said second end of said resonator and said base, said second support means having said first coefficient of thermal expansion characteristic;
   said second support means further comprising a pair of flexures, one located at each of said two spaced locations to provide the entire support provided for said second end of said resonator, each said flexure containing upper and lower ends;
   each said flexure being of sufficient elasticity to resiliently flex in response to force applied by said base to said base end of said second support means to prevent said force from said base from bending or otherwise distorting said resonator, and further being of a sufficient stiffness to withstand compression or bending under a force in the axial direction at least one-hundred times as great as the weight of said gain module, and further being of a sufficient stiffness to withstand compression or bending under a force transverse said axial direction at least one-hundred times as great as the weight of said gain module; and
   said resonator possessing a stiffness characteristic that is sufficiently great to prevent any force transmitted from said base through said second support means during resilient flexure of said flexures of said second support means from bending or otherwise distorting said resonator.

12. The invention as defined in claim 11, wherein each said flexure comprises:
   a rectangular metal beam having a predetermined length, width and thickness, said beam being of sufficient elasticity to elastically flex in responsive to expansion or contraction of said base, and being of sufficient stiffness to prevent bending or compression in response to a force at least one-hundred times as great as the weight of said gain module applied in a direction transverse said width and being of sufficient stiffness to prevent bending or compression in response to a force at least one-hundred times as great as one half said weight of said gain module applied in a direction longitudinal of said length.

13. An improved laser for producing a beam of coherent light comprising:
   a gain module;
   a resonator operatively coupled to said gain module, said resonator having first and second ends and possessing a predetermined weight and stiffness, said resonator including a pair of laser mirrors oriented in parallel;

a base for supporting both said gain module and said resonator, said base having a predetermined thickness and length and coefficient of thermal expansion;

first support means for supporting said first end of said resonator, said first support means being connected to said first end of said resonator and said base, said first support means being rigid and having a first coefficient of thermal expansion characteristic;

second support means for supporting said second end of said resonator, said second support means being connected to two spaced locations on each of said second end of said resonator and said base, said second support means having said first coefficient of thermal expansion characteristic;

said second support means further comprising a pair of flexures, one located at each of said two spaced locations to provide the entire support provided for said second end of said resonator, each said flexure containing upper and lower ends;

each said flexure being of sufficient elasticity to resiliently flex in response to force applied by said base to said base end of said second support means to prevent said force from said base from bending or otherwise distorting said resonator, and further being of a sufficient stiffness to withstand compression or bending under a force in the axial direction at least one-hundred times as great as one half said weight of said gain module, and further being of a sufficient stiffness to withstand compression or bending under a force transverse said axial direction at least one-hundred times as great as one half of said weight of said gain module; and said stiffness characteristic of said resonator being sufficiently great to prevent any force transmitted from said base through said second support means during resilient flexure of said flexures of said second support means from bending or otherwise distorting said resonator.

14. The invention as defined in claim 13, wherein each said flexure comprises:

a rectangular metal beam having a predetermined length, width and thickness, said beam being of sufficient elasticity to elastically flex in responsive to expansion or contraction of said base, and being of sufficient stiffness to prevent bending or compression in response to a force at least one-hundred times as great as one half said weight of said gain module applied in a direction transverse said width and being of sufficient stiffness to prevent bending or compression in response to a force at least one-hundred times as great as one half said weight of said gain module applied in a direction longitudinal of said length.

15. Precision laser apparatus for generating coherent light along a predetermined axis, comprising:

a first mirror;

a second mirror; one of said first mirror and second mirror being totally reflecting to light and the other one thereof being partially reflecting to light and partially transmissive to light;

a base, said base being of a predetermined thickness and length and having an upper surface and a lower surface;

a gain module supported on said upper surface of said base, said gain module being operatively coupled to said mirrors for generating coherent light;

said gain module having first and second ends from which to emit light photons;

first mechanical connection means for mechanically connecting each of said first and second mirrors together in spaced parallel relationship on opposite ends of said gain module and in confronting relationship to a respective one of said opposite ends, wherein one of said mirrors reflects incident light emitted from one end of said gain module back into one end of said gain module and another one of said mirrors reflects a portion of incident light emitted from said other end of said gain module back into an opposite end of said gain module and also transmits a coherent beam of light along said predetermined axis;

first base-to-mirror support means on said upper surface of said base for rigidly supporting an end of one of said first and second mirrors in an elevated position above said upper surface of said base, said first base to mirror support means comprising a material having a first coefficient of thermal expansion characteristic;

second base-to-mirror support means on said upper surface of said base for supporting an end of another one of said first and second mirrors in an elevated position above said upper surface of said base, said second base-to-mirror support means comprising a material also having said first coefficient of thermal expansion characteristic;

said second base-to-mirror support means comprising first and second supports, spaced apart laterally on said base proximate said another one of said first and second mirrors;

said first and second supports further comprising a flexure, said flexure containing upper and lower ends;

said flexure being of a sufficient stiffness to withstand compression or bending under a force at least one-hundred times as great as the weight of said another one of said first and second mirrors, and being sufficient to withstand compression or bending under a force at least one-hundred times as great as the weight of said another one of said first and second mirrors in a direction transverse to said predetermined axis, and being adapted to resiliently flex in response to a longitudinally directed force between its upper and lower ends and in response to a canting force on its lower end;

said base further comprising a material of a predetermined thermal expansion characteristic, whereby said base may lengthen in response to an increase in temperature to create a longitudinally directed force on said lower end of said flexure, and wherein said base may bend in response to a temperature differential between said upper and lower surface to create a canting force on said lower end of said flexure;

said first mechanical connection means being sufficient in stiffness to resist bending in response to force exerted on said another one of said first and second mirrors through said flexure, wherein said mirrors are maintained in relative positions set by said first mechanical connection means even though said laser apparatus is subjected to temperature changes and shock and vibration.

16. The invention as defined in claim 15, wherein said first mechanical connection means comprises:

three rods of carbon graphite material, said rods being oriented in parallel with one another and having respective first and second ends attached at three spaced locations on respective one of said first and second mirrors and being oriented longitudinally of said base; and wherein said gain module is positioned in between said rods.

17. The invention as defined in claim 15, wherein said first mechanical connection means comprises:

an enclosure having two pairs of walls, each wall in a pair being oriented in parallel with the other wall of said pair, and said first pair of walls being oriented perpendicular to said second pair of walls and being connected thereto to define a bordered region; each of said first pair of walls containing an aperture; each of said first and second mirror means being attached to a respective one of the walls of said first pair of walls; and wherein said gain module is positioned within said bordered region.

18. The invention as defined in claim 16, wherein said first and second support means comprise the material stainless steel.

19. The invention as defined in claim 16, wherein said flexure comprises: a thin wide elongate rectangular strip.

20. The invention as defined in claim 15, wherein said flexure comprises: a thin wide elongate rectangular strip.

* * * * *